United States Patent [19]

Shaw et al.

[11] Patent Number: 4,561,501

[45] Date of Patent: Dec. 31, 1985

[54] SURFACTANT OIL RECOVERY SYSTEMS AND RECOVERY OF OIL THEREWITH

[75] Inventors: James E. Shaw; Jerry E. Pardue, both of Bartlesville, Okla.

[73] Assignee: Phillips Petroleum Company, Bartlesville, Okla.

[21] Appl. No.: 508,709

[22] Filed: Jun. 28, 1983

[51] Int. Cl.$^4$ .............................................. E21B 43/22
[52] U.S. Cl. .................................... 166/273; 166/274; 252/8.55 D
[58] Field of Search ................... 252/8.55 D; 166/274, 166/275, 273

[56] References Cited

U.S. PATENT DOCUMENTS

| | | | |
|---|---|---|---|
| 3,170,514 | 2/1965 | Harvey et al. | 252/8.55 X |
| 3,366,174 | 1/1966 | Ferrell et al. | 252/8.55 X |
| 3,373,809 | 3/1968 | Cooke | 252/8.55 X |
| 3,508,611 | 4/1970 | Davis et al. | 252/8.55 X |
| 3,540,532 | 11/1970 | Davis et al. | 252/8.55 X |
| 3,938,591 | 2/1976 | Ossip et al. | 166/275 |
| 3,981,361 | 9/1976 | Healy | 166/252 |
| 4,079,785 | 3/1978 | Hessert et al. | 166/273 |
| 4,125,156 | 11/1978 | Glinsmann | 166/252 |
| 4,274,488 | 6/1981 | Hedges et al. | 166/273 |
| 4,397,777 | 8/1983 | Yurko | 252/383 X |
| 4,457,373 | 7/1984 | Balzer et al. | 252/8.55 X |
| 4,478,281 | 10/1984 | Balzer et al. | 252/8.55 X |

FOREIGN PATENT DOCUMENTS 0058871  9/1982  European Pat. Off. ............ 166/275

*Primary Examiner*—Herbert B. Guynn
*Attorney, Agent, or Firm*—C. F. Steininger

[57] ABSTRACT

In accordance with the present invention, oil is recovered from a subsurface earth formation by injecting into the subsurface formation an aqueous surfactant system containing a polyvalent metal carboxylate, as a surfactant, a cosurfactant and an electrolyte in concentrations and proportions to form multiphase system with the reservoir oil, thereafter, injecting into the earth formation a drive fluid to drive the multiphase system through the reservoir and displace a significant amount of the reservoir oil and withdrawing the thus displaced oil from the subsurface earth formation. A novel aqueous surfactant system, adapted to thus recover oil from a subsurface formation, comprises a polyvalent metal carboxylate, such as calcium isosteareate, as a surfactant, and an alcohol having at least five carbon atoms, as a cosurfactant, and an electrolyte, such as sodium chloride, in proportions which form a multiphase system with the reservoir oil.

15 Claims, No Drawings

SURFACTANT OIL RECOVERY SYSTEMS AND RECOVERY OF OIL THEREWITH

The present invention relates to surfactant oil recovery systems and the utilization thereof in the recovery of oil from subterranean reservoirs containing oil. In a more specific aspect, the present invention relates to polyvalent metal surfactant systems and the utilization thereof for the recovery of oil from subterranean reservoirs containing oil.

BACKGROUND OF THE INVENTION

Oil exists in subterranean formations or reservoirs in a wide variety of forms, in a wide variety of formations and under a wide variety of natural conditions. In most cases natural forces present in the reservoir permit the production of significant amounts of the oil by so-called primary recovery methods. Usually this is brought about by the fact that reservoir pressure, supplied by gas under pressure, either in solution in the oil or as a gas cap, water, etc. is sufficient to force the oil to the surface of the earth. In any event, these so-called primary recovery methods are capable of recovering only minor portions of the original oil in place due to depletion of the natural forces and other factors. In some cases little or none of the oil can be produced by natural forces. Accordingly, a wide variety of supplemental or artifical recovery techniques have been employed and still more have been proposed in order to increase the recovery of oil from subterranean formations. If the artifical recovery technique is utilized in reservoirs having insufficient natural production forces it is often referred to as primary recovery and, if used immediately following discontinuance of primary recovery methods, such technique has been referred to as a secondary recovery technique. If a so-called secondary recovery technique is followed by another artifical recovery technique, the latter has often been referred to as tertiary recovery. However, the lines of demarcation among these three techniques have been obliterated to a certain extent and it is, therefore, best to refer to all such artifical recovery techniques, whether primary, secondary or tertiary, as "enhanced oil recovery" techniques. Irrespective of the name applied to the recovery technique, all such enhanced oil recovery techniques include the injection of a gaseous or a liquid fluid into one or more injection wells under a pressure sufficient to displace or drive at least a portion of the oil from the reservoir, i.e. above the reservoir pressure, and producing the thus displaced oil from one or more producing wells. Obviously, a wide variety of driving fluids or injection fluids and combinations thereof have been proposed. However, the basic drive fluids or injection fluids include air, natural gas, carbon dioxide, propane, steam, water, surfactants and polymers. Unfortunately, none of these materials is an ideal displacement fluid due to a number of factors which affect the amount of oil which can be recovered by enhanced oil recovery techniques.

It has long been recognized that the major factors which influence the amount of oil recovered by enhanced oil recovery techniques include the relative mobility of the reservoir oil and injected fluid, the wettability characteristics of the rock surfaces within the reservoir and the interfacial tension between the injected fluid and the reservoir oil.

Obviously, if plug-type flow of oil and displacing fluid from injection wells to production wells could be accomplished substantial amounts of the oil in place could be displaced. However, this is generally not accomplished because of the fact that most displacing fluids will travel faster through the reservoir than the oil because of adverse mobility ratios. While a rather simplistic explanation, the relatively low viscosity of gases, as opposed to the oil, causes the gas to follow paths of least resistance, with the result that the gas will channel through fractures and fissures, selectively pass through zones of higher permeability and in general contact a small area of the reservoir in passing from the injection well to the production well. In addition, gravity segregation of the injected gas and the oil causes the gas to rise to the top of the reservoir where it tends to ride over the top of the oil bank. Accordingly, while gases such as natural gas and air are usually readily available and relatively inexpensive, they are also relatively inefficient as displacing media under ordinary conditions. In addition, one must also consider the cost of compressing the gas to a pressure sufficient for displacement of the oil. On the other hand, liquids have a more favorable mobility ratio with respect to reservoir oil due primarily to their greater viscosity. Consequently, conventional water injection or waterflooding has been the most widely practiced enhanced oil recovery technique. However, the mobility ratio between water and reservoir oil is still generally poor. Accordingly, numerous modifications of conventional waterflooding have been proposed to overcome this problem. These include thickening the water with various materials, such as polymers, forming viscous water-oil emulsions by the use of surfactants, etc. Obviously, these thickening or emulsifying materials are expensive and cannot be used throughout the entire waterflood. Hence the thickening agent or emulsion is utilized only in that portion of the water in contact with the oil. An alternative is the injection of a small slug of polymer, generally having a viscosity greater than the viscosity of the oil, at the contact between the polymer and the oil, and a terminal viscosity, at the contact with the water, which is near that of the viscosity of water. Such graded concentration is usually logarithmic, from the viscosity of the reservoir oil to the viscosity of the water. In other variations, a thickening or viscosifying agent is preceded by one or more other displacing media and followed by water.

The wettability characteristics of the rock surfaces also affect displacement of oil by water. If the rock surfaces are oil wet, substantial amounts of the oil will adhere to the rock surfaces and resist displacement by the water. If the oil wettability of the rock surfaces can be altered either by decreasing the oil wettability or even reversing the wettability, to render the rock surface water wet, substantial improvement in oil displacement by water can be attained. Such reduction of oil wettability or reversal of wettability can also be accomplished by the utilization of surfactants. However, as previously discussed, such surfactants are expensive and therefore must be utilized in limited quantities, generally as a slug ahead of the water drive.

The interfacial tension between a displacing fluid and reservoir oil is primarily dependent upon the ability of the two materials to mix. As a result miscible replacement techniques have been developed. For example, if natural gas is compressed to a sufficiently high pressure, usually above about 3000 psi, the gas can be rendered miscible with the reservoir oil. However, in some cases, if the miscibility pressure is too high to be practical or the reservoir cannot withstand pressures of this magnitude, this process cannot be used. In addition, the additional compression cost also adds to the cost of the project. Where applicable, however, this technique has proven quite effective. Similarily, at lower pressures, carbon dioxide can be rendered miscible with reservoir oils and miscible displacement can be carried out by displacing the oil with carbon dioxide. In addition to the advantage of the lower miscibility pressure, carbon dioxide has the advantage of a relatively high solubility in water. Consequently, techniques have been proposed in which a slug of carbon dioxide is followed by water or the carbon dioxide is dissolved in the water. At still lower pressures ethane and propane and mixtures thereof can be made miscible with reservoir oil. However, these materials, particularly propane, are expensive relative to the value of the oil displaced and accordingly can not be utilized in unlimited amounts. As a result the "propane slug process" has been developed in which a slug of propane is driven through the reservoir by gas, usually natural gas, under conditions such that the propane is miscible with the oil being displaced and with the driving gas. Again, while this technique is effective in appropriate reservoirs, utilization of gases as the drive fluid interjects the above-mentioned problems of mobility. Finally, under certain conditions, surfactants can be utilized in the miscible displacement of oil. At this point it should be recognized that the terms "miscible" and "miscibility", as they relate to enhanced oil recovery techniques, have been somewhat misused, for example by the use of terms such as "partial miscibility". However, what is generally meant by such terms is that one fluid is partially soluble in the other. Consequently, a more accurate definition of "miscible" or "miscibility", and the definition which will be utilized herein, is that the two fluids in question are mixable with each other in all proportions and of "solubility", that there is a limit to the amount of a material which is soluble in or will mix with a fluid. While miscibility between the reservoir oil and the displacing fluid can be said to be ideal, to the extent that the oil-water interfacial tension is minimal, it is not necessary to obtain miscibility in order to reduce the oil-water interfacial tension and substantially improve displacment of oil by the drive fluid. Significant lowering of oil-water interfacial tension can be accomplished by the utilization of surfactants and highly effective immiscible displacement can be attained.

It is obvious from the above that the utilization of surfactants in enhanced oil recovery techniques has numerous advantages over the other techniques discussed. As previously indicated, the surfactant reduces the interfacial tension between a surfactant solution and reservoir oil and alters the oil wettability of the rock surfaces, thus substantially improving displacement of the oil. Secondly, since the surfactant solution is a liquid, it can be driven by water and the disadvantages of unfavorable mobility ratios, which are present when gases are used as drive fluid, are significantly reduced. Finally, enhanced oil recovery techniques utilizing surfactants can be utilized in reservoirs which have already been subjected to other recovery techniques, particularly where the reservoir has been produced to its economic limits by waterflooding. As a result, a substantial amount of research has been carried out in developing a wide variety of techniques utilizing surfactants and in improving the basic forms of these techniques. As previously indicated, because of the relative cost of surfactants, the surfactants are generally utilized in small amounts or in slug type operations in which the surfactant solution is driven through the reservoir by water.

The most basic of the surfactant techniques involves the injection of an aqueous surfactant solution, simply to reduce the oil-water interfacial tension. Such techniques are often referred to as "low tension waterflooding" techniques. Today one of the most promising low tension waterflooding techniques involves the injection of aqueous solutions of petroleum sulfonates, having a predetermined equivalent weight range, under controlled conditions of salinity. This basic technique is further improved by sequential injection of a protective slug, the surfactant slug, a mobility control slug and finally water. The protective slug is an aqueous solution of sodium chloride which is injected in order to displace reservoir water ahead of the subsequently injected surfactant slug. The protective slug is substantially free of divalent ions which would tend to precipitate the subsequently injected surfactant. The surfactant slug comprises an aqueous solution of petroleum sulfonates and contains sodium chloride in a concentration, typically between about 1.0 to 7.0 weight percent, which will promote the desired low interfacial tension between the injected water and the reservoir oil. The subsequently injected mobility control slug is a thickened water slug containing a viscosifier or thickening agent, such as a water soluble biopolymer or polyacrylamide. The mobility control slug is preferably of logarithmically graded concentration in order to provide an initial viscosity greater than the viscosity of the reservoir oil and a terminal viscosity near that of water. Finally, the driving fluid may be water from any source, but is usually brine present in the reservoir with the oil. In addition to petroleum sulfonates, a wide variety of synthetic sulfonates and complex sulfonates derived from either petroleum or synthetic sources have been proposed to further improve the process and overcome other problems which exist in certain reservoir environments.

As previously indicated, surfactants may be utilized under conditions to produce miscible or immiscible displacement of the oil. In addition, such surfactants have been used in systems which do not form microemulsions and those which do form microemulsions. In recent years considerable research has been devoted to the latter systems.

The microemulsions which have been proposed have been selected from compositions in the single phase region of a ternary diagram. Such microemulsion systems can be either oil-external microemulsions or water-external microemulsions. When such microemulsion systems are used, it is believed that the initial stages of oil recovery involve an efficient miscible displacement with subsequent immiscible displacement, upon the breaking down of the microemulsion into multiple phases due to dilution of the microemulsion with crude oil and reservoir water at its leading edge and dilution with the aqueous drive fluid at its trailing edge. Hence, optimization of such microemulsion surfactant systems is approached in terms of minimization of the multiphase region in the phase diagram so as to prolong miscible displacement with low interfacial tensions in the multiphase regions to thereby enhance immiscible displacement. From a practical standpoint, however, the development of effective microemulsion systems which can economically recover oil from a subterranean formation suffers from certain drawbacks in that it is difficult to maintain miscible displacement and it is difficult to obtain the low interfacial tensions necessary to provide effective immiscible displacement after miscible displacement ceases.

Surfactant systems have been developed which form microemulsions on contact with the reservoir oil. For example, U.S. Pat. No. 3,373,809 discloses recovering oil through the formation of a microemulsion formed in situ by injecting a surfactant system. This patent is based on the formation of a single phase microemulsion system with the reservoir oil by injecting a surfactant system to form the microemulsion system in situ. However, in order to achieve the desired results, extremely high concentrations of surfactant must be utilized. Such quantities of surfactant are usually in excess of about 7% to 15% by weight so as to provide a composition within the single phase region of a ternary diagram and, as such, can easily exceed the value of the oil recovered. Accordingly, it is becoming well recognized that it is impractical from an economic standpoint to maintain such a highly concentrated surfactant composition in the reservoir, which will remain effectively miscible throughout the lifetime of the operation, as proposed by the above patent and others.

Recent work has led to the suggestion of injecting microemulsion systems wherein the microemulsion phase is immiscible with the resident fluids in the reservoir. For example, U.S. Pat. No. 3,885,628 proposes to form a multiphase microemulsion system above ground by mixing oil, brine and surfactant and injecting at least the immiscible microemulsion phase. In some cases this patent suggests injecting one or more of the other phases, which exist in equilibrium with the microemulsion phase along with the immiscible microemulsion phase. Later work, as set forth in U.S. Pat. No. 3,981,361, describes procedures for producing surfactant systems above ground which are injected as an immiscible microemulsion. In this case emphasis is placed on the injection of the single immiscible surfactant-rich microemulsion phase. Also, U.S. Pat. No. 3,938,591 discusses the injection of immiscible microemulsion systems which resist uptake of oil and water into the immiscible microemulsion phase. In the last three techniques described, there is the obvious disadvantage of requiring the injection of a composition containing substantial amounts of oil which, of course, adds to the cost of the injected composition. In addition, there is the problem of achieving the optimum system for a given oil, since it turns out that different oils behave differently.

In order to overcome the above-mentioned and other difficulties encountered in the prior art use of surfactants in oil recovery, U.S. Pat. Nos. 4,079,785 and 4,125,156, which are incorporated herein by reference, disclose that an effective immiscible surfactant drive can be carried out by injecting a slug of surfactant solution comprising a surfactant, an electrolyte, preferably a monovalent metal electrolyte, usually sodium chloride, water and, optionally, a cosurfactant to form a multiphase system in situ in the reservoir which comprises; at least two different regions, for example, an oil-rich region and a microemulsion region. The latter patent points out that best results are obtained when three different multiphase regions are formed, namely, a microemulsion, in equilibrium with an oil phase, a microemulsion in equilibrium with both an oil phase and a water phase and a microemulsion in equilibrium with a water phase. It is pointed out in this patent that among the variables which affect the three-phase region in which a particular system will partition are salinity, oil type, surfactant average equivalent weight, cosurfactant type and temperature. The patent also goes on to point out that, if all variables are fixed except the salinity, the system will shift from a microemulsion in equilibrium with on oil phase to a microemulsion in equilibrium with both an oil phase and a water phase to a microemulsion system in equilibrium with a water phase, as the salinity increases from zero. Finally, the patent sets forth a simple procedure which can be carried out in a laboratory to establish the system of water, electrolyte, surfactant and, optionally, cosurfactant and the proportions thereof which will be most effective for enhancing oil recovery when injected into the reservoir of interest. This laboratory procedure involves equilibration of water from the reservoir of interest or synthesized reservoir water, the surfactant, and optionally the cosurfactant, and oil from the reservoir of interest, a synthesized oil from the reservoir of interest or pure hydrocarbons or mixtures thereof having an equivalent alkane carbon number matching that of the reservoir oil at differing electrolyte concentrations. The optimum system which would be most effective for enhancing oil recovery is that system which will form the second phase, i.e., a microemulsion in equilibrium with both an oil phase and a water phase over a narrow range of salinity. This optimum salinity can, of course, occur at different electrolyte concentrations, depending upon the characteristics of the water and the oil.

Any of the surfactant systems previously discussed, whether those which form a microemulsion or those which do not or those which are miscible or those which are immiscible with the resident fluids, can contain varying amounts of monovalent metal electrolytes, either as components of the formation water, as added electrolytes or both. In some cases the salinity of the surfactant system, which is injected into the reservoir may range up to 4.0%. In addition, the so-called "high brine" reservoirs contain formation waters with substantial amounts of monovalent metal salts and/or polyvalent metal salts or ions, such as calcium and magnesium ions, in concentrations as high as 20,000 parts per million in the case of the polyvalent metal ions. Such high brine environments limit the usefulness of most surfactants, since such surfactants lack stability in such environments. Specifically, the surfactants tend to precipitate in the presence of monovalent salts such as sodium chloride at concentrations in excess of about 2 to 3 weight percent and in the presence of polyvalent metal ions, such as calcium and magnesium ions, at concentrations of about 50 to 100 parts per million and above. Such precipitation of the surfactants not only reduces the amount of surfactant available for lowering interfacial tension and altering rock wettability but the precipitates, in some cases, will eventually plug the formation. While a wide variety of anionic and nonionic surfactants have been proposed as surfactants in oil recovery techniques and the latter are generally more tolerant to high brine environments than the former, surfactants used predominately to date have been petroleum sulfonates and synthetic alkyl or alkylaryl sulfonates. While these surfactants are comparatively inexpensive, are readily available and are extremely effective in reducing interfacial tension to desired low values within the millidyne per centimeter range, they are also the least stable in high brine environments. In any event, most such surfactants can be satisfactorily utilized only if the calcium and magnesium concentration of the formation water is below about 500 parts per million.

In view of the limitations imposed on the use of certain surfactant types in high brine environments, various amphoteric surfactants which are stable in high brine environments have been proposed. For example, a mixture of sulfonated betaine, an alkyl or alkylaryl sulfonate and a phosphate ester sulfonate, amphoteric quaternary ammonium carboxylates, certain hydrocarbyl quaternary ammonium sulfonates or carboxylates, a mixture of an anionic surfactant, such as an alkyl or alkylaryl sulfonate, a water soluble salt of an alkylpolyethoxylated sulfate, an anionic surfactant, such as sodium dodecylpolyethoxy sulfate, and a nonionic surfactant such as a fatty acid diethanolamide, mixtures of a quaternary ammonium sulfonate with a $C_5$-$C_8$ aliphatic alcohol, etc. Obviously, most of these proposed surfactants or mixtures increase the cost of the operation and, in the case of mixtures, the proportions of the components are highly critical. It has also been suggested that the detrimental effect of polyvalent metal ions can be avoided by the addition of a catalytic agent to the floodwater or by preflooding the reservoir to displace the divalent salt-containing brines and thereby eliminate the problem. Here again, the addition of other materials to the recovery system will increase the cost of the operation and manipulative techniques, such as preflooding, unduly extend the time necessary to obtain recovery and the cost.

SUMMARY OF THE INVENTION

It is therefore an object of the present invention to provide an aqueous surfactant system which overcomes the above-mentioned and other problems of the prior art. Another object of the present invention is to provide an aqueous surfactant system adapted to recover oil from a subsurface earth formation. Still another object of the present invention is to provide an aqueous surfactant system adapted to displace oil from a subsurface earth formation under immiscible conditions. A further object of the present invention is to provide an improved aqueous surfactant system adapted to be utilized in high salt and/or hard brine environments. A still further object of the present invention is to provide an improved aqueous surfactant system which is highly tolerant to high salt and/or hard brine environments. Yet another object of the present invention is to provide an improved aqueous surfactant system resistant to surfactant precipitation under high salt and/or hard brine conditions. A further object of the present invention is to provide an improved aqueous surfactant system for the recovery of oil from a subsurface earth formation characterized by high salt and/or hard brine conditions. A still further object of the present invention is to provide an improved method for the recovery of oil from a subsurface earth formation which overcomes the above-identified and other problems of the prior art. Another and further object of the present invention is to provide an improved method for the recovery of oil from a subsurface earth formation which utilizes a novel aqueous surfactant system. Still another object of the present invention is to provide an improved method for the recovery of oil from a subsurface earth formation utilizing an aqueous surfactant system adapted to immiscibly displace oil. Another and further object of the present invention is to provide an improved method for the recovery of oil from a subsurface earth formation under high salt and/or hard brine conditions. Yet another object of the present invention is to provide an improved method for the recovery of oil from a subsurface earth formation utilizing an aqueous surfactant system which is resistant to high salt and/or hard brine environments. A still further object of the present invention is to provide an improved method for the recovery of oil from a subsurface earth formation which utilizes a novel surfactant system which is resistant to the precipitation of surfactant under high salt and/or hard brine conditions. A still further object of the present invention is to provide an improved method for the recovery of oil from a subsurface earth formation utilizing an aqueous surfactant system in conjunction with an aqueous drive fluid. Another and further object of the present invention is to provide an improved method for the recovery of oil from a subsurface earth formation, which has been subjected to waterflooding, wherein an aqueous surfactant system is utilized. These and other objects and advantages of the present invention will be apparent from the following description.

In accordance with the present invention, oil is recovered from a subsurface earth formation by injecting into the subsurface formation an aqueous surfactant system containing a polyvalent metal carboxylate, as a surfactant, a cosurfactant and an electrolyte in concentrations in and proportions to form a multiphase system with the reservoir oil, thereafter, injecting into the earth formation a drive fluid to drive the multiphase system through the reservoir and displace a significant amount of the oil and withdrawing the thus displaced oil from the subsurface earth formation. A novel aqueous surfactant system, adapted to thus recover oil from a subsurface formation, comprises a polyvalent metal carboxylate, such as calcium isostearate, as a surfactant, an alcohol, having at least five carbon atoms, as a cosurfactant, and an electrolyte, such as sodium chloride, in proportions which form a multiphase system with the oil.

DESCRIPTION OF THE PREFERRED EMBODIMENTS

As previously pointed out in the introductory portion hereof, it is known to recover oil from subsurface earth formations by injecting surfactant systems into the reservoir and, following the thus injected surfactant system with an aqueous drive fluid. Such surfactant systems utilize surfactants of the anionic or nonionic type, such as sulfonates, sulfates, carboxylates, etc. The surfactant system usually contains an electrolyte and optionally a cosurfactant. The surfactant system may or may not form microemulsions when contacted with the reservoir oil, either at the surface of the earth or within the formation, and displacement of the oil may be under miscible or immiscible conditions. The use of such surfactant systems is particularly advantageous where the subsurface formation has been previously subjected to a waterflooding operation. In all instances, it has been clearly pointed out that surfactant systems containing polyvalent metal ions, either in a surfactant or as the electrolyte, are detrimental to the recovery system, primarily because of the precipitation of the surfactants, thus depleting the surfactant and, in some cases, resulting in plugging of the formation. Likewise, the prior art has recognized that the presence of high concentrations of monovalent metal ions, i.e. high salt conditions, and the presence of high concentrations of polyvalent metal ions, i.e., hard brine conditions, in the subsurface formation detrimentally affect the recovery of oil from subsurface earth formations with aqueous surfactant systems and, therefore, resort to complex manipulative procedures to avoid this problem and the utilization of complex and relatively expensive surfactants and mixtures of surfactants to render the surfactant system tolerant to high salt and/or hard brine conditions.

Contrary to these teachings of the prior art, it has been found, in accordance with the present invention, that oil can be effectively recovered from a subsurface earth formation by the utilization of a surfactant system containing polyvalent metal carboxylates, as a surfactant. A novel surfactant system useful in accordance with the present invention comprises an aqueous surfactant system containing a polyvalent metal carboxylate, an alcohol having at least five carbon atoms per molecule, as a cosurfactant, and an electrolyte. It has also been found, in accordance with the present invention, that these aqueous surfactant systems are tolerant to high concentrations of monovalent metal ions and high concentrations of polyvalent metal ions, in either or both of the surfactant system itself or the subsurface earth formation.

The polyvalent carboxylates useful in accordance with the present invention may be any polyvalent metal carboxylate, preferably an alkaline earth metal carboxylate and still more preferably a carboxylate of a metal selected from the group consisting of calcium and magnesium.

Polyvalent metal carboxylates may be obtained from any of the known carboxylic acids, preferably those with at least 7 carbon atoms per molecule and still more preferably those having at least 18 carbon atoms per molecule. The source carboxylic acids may include branched aliphatic acids, such as isostearic acid, which is usually available as a complex mixture of $C_{18}$ fatty acids with branched alkyl groups; 3, 7, 11, 15-tetramethylhexadecanoic acid, etc.; unbranched aliphatic acids, such as oleic acid (unsaturated), stearic acid (saturated), etc.; naphthenic acid, $C_7$–$C_{14}$ aliphatic carboxylic acids with saturated 5 or 6 carbon rings; tall oil acids, crude or refined, usually containing about 60% oleic acid and related fatty acids, 35% abietic acid and related rosin acids and 5% unsaponifiables; aromatic acids, such as p-(1-pentylnonyl) benzoic, p-(1-pentyldecyl) benzoic, 2-benzylhexadecanoic, 2-benzyloctadecanoic, etc.

Surfactants prepared from the above mentioned carboxylic acids were found to be effective in oil recovery in the following order (from best to least effective); branched aliphatic, tall oil, stearic, aromatic and naphthenic. However, even the least effective resulted in oil recoveries in excess of about 50%. In any event, the carboxylic acids were found to be at least equal to or better than the comparable sulfonates and, in most cases, the carboxylates are substantially less expensive than the sulfonates. Based on these comparisons, the carboxylic acid should have at least 7 carbon carbon atoms and preferably at least 18 carbon atoms.

The cosurfactant of the surfactant system of the present invention may be an alcohol having from 1 to 12 carbon atoms per molecule. However, it has been found, in accordance with the present invention, that, in combination with the calcium carboxylates of the present invention, alcohols having less than 5 carbon atoms per molecule are substantially inferior to cosurfactant alcohols having at least 5 carbon atoms per molecule, such as isopentyl alcohol, 1-hexanol, etc. The cosurfactant can also be an alcohol having 1 to 20 carbon atoms per molecule which has been ethyloxylated with an average of 1 to 12 ethylene oxide units per molecule, for example, ethyloxylated 2-ethylhexanol, the Tergitols (Trademark of Union Carbide Corporation), which average 2 to 6 ethylene oxide units per molecule, etc. The Tergitol 25-L series are ethyloxlated $C_{12}$–$C_{15}$ primary aliphatic alcohols and the Tergitol 15-S series are ethyloxylated $C_{11}$–$C_{15}$ secondary aliphatic alcohols, etc.

The amount of cosurfactant will generally be approximately equal to the amount of surfactant, namely, from about 0.1 to 10, and preferably about 2 to 5 wt. percent active ingredient based on the weight of the water.

An optional, but preferred, component of the surfactant system of the present invention is a hydrocarbon solvent in an amount sufficient to maintain the carboxylate surfactant in solution. The hydrocarbon solvent may be any pure hydrocarbon, such as n-decane, etc. up to crude oils themselves.

The amount of hydrocarbon solvent is extremely small, as distinguished from prior art surfactant recovery techniques in which substantial volumes of oil are mixed with an aqueous surfactant system at the surface of the earth prior to injection. More specifically, hydrocarbon solvent amounts between about 0.1 and 5% have been found adequate, preferably between about 1.0 and 1.5 wt. percent.

While the surfactant systems of the present invention may be utilized in miscible displacement of oil from a subsurface earth formation by utilizing extremely large volumes of surfactant and cosurfactant, the preferred technique, in accordance with the present invention, is utilization of the surfactant systems of the present invention in small quantities to attain immiscible displacement. Such immiscible displacement is of the character previously referred to in U.S. Pat. Nos. 4,079,785 and 4,125,156. However, the immiscible displacement in accordance with the present invention differs from that of the patents referred to, since it has been found by phase volume studies that only two phases are formed by contact of the surfactant system of the present invention with reservoir oil, as opposed to the 3-phase system obtained in accordance with the reference patents. Specifically, in accordance with the present invention, it was found that when a surfactant system, comprising calcium isostearate, isopentyl alcohol, sodium chloride and n-decane, is equilibrated with n-decane (representing reservoir oil) two phases, comprising an upper phase consisting predominately of calcium isostearate, isopentyl alcohol and n-decane and a lower phase consisting predominately of sodium chloride and water were formed. However, as illustrated by the Example set forth hereinafter, the surfactant system of the present invention is highly effective for displacing reservoir oil.

The surfactant system of the present invention of the present invention has also been found to be highly effective for the displacement of oil in high salt and/or high brine environments.

In the recovery of oil from a subsurface earth formation, in accordance with the present invention, the surfactant system is preferably preceded by a protective or preflush slug. The preflush slug may be an aqueous solution of sodium chloride, sodium bicarbonate, sodium carbonate, sodium hydroxide, sodium orthosilicate and mixtures thereof, the amount of salt being sufficient for optimal salinity and the amount of base being sufficient to attain the desired pH. Preferably, the preflush slug also contains a small amount of the cosurfactant, for example, between about 0.1 and 10%, preferably between about 2 and 5% of the cosurfactant. The volume of the preflush slug may be in the neighborhood of about 10% of the pore volume of the reservoir. The appropriate pH, the quantities of salt and/or base and the volume of the slug of the preflush are all well known or readily determined by those skilled in the art and details thereof are not believed necessary.

The volume of the surfactant system to be injected will depend on many factors, but in any event, can be readily determined by one skilled in the art. For example, a surfactant system slug in the neighborhood of about 20% of the pore volume of the reservoir has been found to be adequate.

Preferably, also, a freshwater or low salinity mobility buffer is injected behind the surfactant system. The character, ingredients, amounts of ingredients and volume of the mobility control slug are also well known to those skilled in the art. For example, the mobility control slug will contain a viscosifier or thickening agent, such as a water-soluble biopolymer or polyacrylamide and is preferably logarithmically graded in concentration from an initial viscosity equal to or greater than the viscosity of the reservoir oil to a terminal viscosity near the viscosity of water. The volume of the mobility control slug can, for example, be in the neighborhood of 50% of the pore volume of the reservoir. Finally, water, preferably freshwater or low salinity water, is injected behind the mobility control slug.

The following example illustrates the effectiveness of the surfactant systems of the present invention for the recovery of waterflood residual oil from Berea sandstone cores.

The following experimental procedure was used to condition waterwet Berea sandstone cores for all of the runs to demonstrate the effectiveness of the inventive polyvalent metal carboxylates in tertiary oil recovery.

Berea sandstone cores, measuring approximately 3 feet in length and 3 inches in diameter, were dried under vacuum for 24 hours at 250° F. Polycarbonate discs and plates, with centrally located $\frac{1}{8}''$ threaded openings, were secured to each end of the core with epoxy adhesive before applying an epoxy coating to the outside surface of the core. The epoxy coating material was formulated by mixing 550 g of a commercially available epoxy resin, 50 g of a suitable activator and 140 g diatomaceous earth. This mixture was stirred until smooth before applying to the surface of the core. The cores were rotated continuously as the epoxy mixture was applied with a 2" paint brush. Four gauze strips measuring 2"×12" were applied to the core in the following manner: a first gauze strip was applied to the core and covered with epoxy as the core was rotated; the remaining three strips were then individually incorporated in a similar manner. The core coating was cured over a period of about 4 hours at ambient temperature as the core was rotated. One-eighth inch male connector fittings were placed on each end of the core and pipe plug caps were put on the core.

The core was weighed to determine the dry weight before being saturated with brine of the desired concentration. A vacuum of about 1 mm was pulled on the core before saturating the core with approximately 500 ml of brine. After saturation, approximately 100 to 200 ml of brine was pumped through the core before determining the original permeability to water. A 1 ml portion of effluent brine was collected from the saturated core and thereafter, during a period of one minute, the volume of additional effluent collected and the pressure and psi were recorded. With these values, the original permeability to water, e.g., on the order of 3.2 ml/min at 43 psi, could be recorded. The pore volume of the core was calculated by the relationship:

$$\frac{\text{Brine-Saturated Core Wt (g)} - \text{Dry Core wt (g)}}{\text{Brine Density (g/ml)}} =$$

Core Pore Volume (ml)

The brine-saturated core was oil flooded in the conventional manner until oil break-through became detectable by the presence of alternate globules of oil and water in the effluent line. The oil flood was carried out to completion by 24-hour recycling of oil through the core to remove all of the displaceable water. The total water displaced, i.e., water displaced at the point of oil break-through and water displaced by the 24-hour recycle procedure, was recorded as water displaced by oil flood. If desired, oil permeability was determined in a manner analogous to that used above for establishing original permeability to water. Prior to waterflood, the effluent line was air blown to remove oil.

The oil-flooded core was waterflooded in the conventional manner until water break-through became detectable by the presence of alternate globules of oil and water in the effluent line. The waterflood was carried to completion by 24-hour recycling of water through the core to remove all of the displaceable oil. The total oil displaced, i.e., oil displaced at the point of water break-through and oil displaced by the 24-hour recycle procedure, was recorded as oil displaced by waterflood. If desired, water permeability after waterflood can be determined in a manner analogous to that used above for original permeability to water. The residual oil volume remaining in the core was calculated by subtracting the oil volume displaced by the waterflood from the water volume displaced by the oilflood. At this point, the core simulated an oil reservoir which had been exhaustively waterflooded. Cores were routinely conditioned in this manner prior to carrying out surfactant flood tests.

EXAMPLE I

A preflush solution was prepared by dissolving 1.0 g sodium bicarbonate, 0.5 g anhydrous sodium carbonate, 12.5 g sodium chloride and 15.0 g isopentyl alcohol in 465 ml distilled water. The pH of the mixture was adjusted to 9.4 by the dropwise addition of aqueous NaOH and then the total weight of the mixture was adjusted to 500 g with distilled water.

A surfactant system was prepared by dissolving 11.2 g isostearic acid (Union Camp Chemical Co.) in 350 ml distilled water containing 12 g isopentyl alcohol and 1.41 g sodium hydroxide. After the addition of 1.20 g sodium bicarbonate and 8.0 g sodium chloride, the pH was adjusted to 9.4, as described above, before adding 2.58 g $CaCl_2 \cdot 2H_2O$ and 4.0 g n-decane. The pH was adjusted to 9.4, as before, and the total weight of the mixture was brought to 400 g by adding distilled water. A two-phase system resulted in which the calcium isostearate was primarily distributed in the upper organic phase.

A mobility buffer solution was prepared by dissolving 1.63 g Betz Hi Vis (Trademark of Union Carbide Corp.) polyacrylamide polymer in 1000 ml Arkansas-Burbank water (<600 ppm total dissolved solids).

The viscosity of this solution was 42.8 cp at 6 rpm and 120° F.

A brine solution for core saturation and waterflood was prepared by dissolving 75 g of sodium chloride in 2925 ml of Arkansas-Burbank water.

The results of the core runs are summarized in Table I. The only difference in core runs 1 and 2 was in the mobility buffer salinity. In run 1, the mobility buffer was diluted logarithmically with Arkansas-Burbank water (<600 ppm total dissolved solids) and in run 2, the mobility buffer was diluted logarithmically with 1.5 weight percent NaCl solution. In core run 3 no isostearate surfactant was used.

core at 120° F. was carried out in the following way: A 50% pore volume preflush slug containing 3.0% isopentyl alcohol and 5.0% sodium chloride was injected. This was followed by a 20% pore volume surfactant slug containing 3.0% calcium isostearate (from isostearic acid and $Ca(OH)_2$), 3.0% isopentyl alcohol, 5.0% NaCl, and 1.5% n-decane. The surfactant mixture was two-phase and was stirred when injected. The surfactant slug was followed by a mobility buffer (50% pore volume) of 40 centipoise Betz Hi Vis polyacrylamide in Arkansas Burbank water, and this was diluted back logarithmically with Arkansas Burbank water. The tertiary oil recovery was 54%.

TABLE I

| Core | Surfactant | Cosurfactant | Wt % NaCl Salinity | Initial Salinity of Mobility Buffer | Final Diluted Salinity of Drive Water | % Oil Recovery |
|------|------------|--------------|-------------------|-------------------------------------|---------------------------------------|----------------|
| 1[a] | Calcium[c] isostearate | isopentyl alcohol | 2.5* | Arkansas-Burbank Water | Arkansas-Burbank Water | 72 |
| 2[a] | Calcium[c] isostearate | isopentyl alcohol | 2.5* | 1.5 wt. % NaCl solution | 1.5 wt. % NaCl solution | 54 |
| 3[b] | None | isopentyl alcohol | 2.5* | Arkansas-Burbank Water | Arkansas-Burbank Water | <1 |

*A salinity of 2.5 wt. % NaCl corresponds to the optimal salinity of sodium isostearate. In phase volume analysis, the calcium isostearate did not exhibit three phase behavior and hence no readily established optimal salinity.
[a]A 25% pore volume preflush slug containing 3 wt. % isopentyl alcohol, 0.3 wt. % $NaHCO_3$—$Na_2CO_3$ and 2.5 wt. % NaCl, at pH 9.4, was injected prior to the surfactant slug.
[b]No surfactant was in the slug which followed the preflush slug described in footnote a.
[c]The two-phase surfactant system was stirred continuously in a storage vessel during its injection into the core.

As indicated, the surfactant system utilized in the above example, formed a two-phase, as opposed to a three-phase system, and, accordingly, an optimal salinity could not be readily established by conventional methods as set forth in the previously mentioned U.S. Pat. Nos. 4,079,785 and 4,125,156. However, an optimal salinity for the two-phase system of the present invention can be determined by one skilled in the art simply by carrying out a series of oil displacements, as outlined in Example I, at a series of different salinities and determining the salinity at which maximum oil recovery is obtained. It should also be recognized at this point that the novel surfactant system of the present application could be utilized in a miscible displacement operation by utilizing substantially larger volumes of surfactant and cosurfactant. However, this is impractical and uneconomic, considering the high recoveries attainable by immiscible displacement using extremely small amounts of surfactant and cosurfactant.

It is evident from the above example that surprisingly high recoveries of waterflood residual oil can be obtained in accordance with the present invention and with extremely small amounts of surfactant and cosurfactant. On the other hand if only a cosurfactant is utilized (in some instances recognized as a solubilizing agent in waterflooding) the recovery was practically zero.

EXAMPLE II

An additional oil displacement test was carried out where the following changes were made:
(1) Calcium isostearate was prepared from isostearic acid and calcium hydroxide rather than from sodium isostearate and calcium chloride.
(2) No sodium bicarbonate or sodium carbonate was used in the preflush or surfactant slugs.
(3) A higher sodium chloride concentration (5%) was used.

Displacement of waterflood residual North Burbank Unit crude oil from a 1 ft. water-wet Berea sandstone While specific materials, equipment and modes of operation have been set forth above, it is to be understood that these specific recitals are by way of illustration and to set forth the best mode, in accordance with the present invention, only and are not to be considered limiting and that substitutes, equivalents, variations and modifications thereof will be apparent to one skilled in the art without departing from the present invention.

That which is claimed is:

1. A method for immiscibly displacing oil from a subsurface earth formation containing the same, comprising:
   (a) injecting into said subsurface earth formation an aqueous surfactant system wherein the surfactant consists of at least one alkaline earth metal carboxylate having at least 7 carbon atoms and consisting of an alkaline earth metal carboxylate radical and an aliphatic hydrocarbon radical having at least one alkyl side chain, in an amount between about 0.1 and 10% by weight, a cosurfactant comprising an alcohol having at least 5 carbon atoms per molecule, in an amount between about 0.1 and 10% by weight, and an electrolyte, in concentrations and proportions sufficient to form an immiscible two-phase mixture with said oil, comprising an upper phase predominating in said surfactant, said cosurfactant and said oil and a lower phase predominating in water and said electrolyte;
   (b) thereafter injecting into said subsurface earth formation a drive fluid to drive said surfactant system through said subsurface earth formation and displace a significant amount of said oil; and
   (c) withdrawing the thus displaced oil from said subsurface earth formation.

2. A method in accordance with claim 1 wherein the surfactant system additionally contains a hydrocarbon solvent, in an amount between about 0.1 and 5% by weight.

3. A method in accordance with claim 2 wherein the hydrocarbon solvent is in n-decane.

4. A method in accordance with claim 1 wherein the alkaline earth metal is selected from the group consisting of calcium and magnesium.

5. A method in accordance with claim 1 wherein the carboxylate is an isostearate.

6. A method in accordance with claim 1 wherein the alkaline earth metal carboxylate is calcium isostearate.

7. A method in accordance with claim 1 wherein the alcohol is a branched-chain aliphatic alcohol.

8. A method in accordance with claim 7 wherein the branched-chain aliphatic alcohol is isopentyl alcohol.

9. A method in accordance with claim 1 wherein the subsurface formation contains water and an aqueous preflush slug is injected into said subsurface earth formation prior to the injection of the surfactant system.

10. A method in accordance with claim 9 wherein the preflush slug contains an electrolyte.

11. A method in accordance with claim 10 wherein the preflush slug additionally contains a second alcohol having at least 5 carbon atoms per molecule.

12. A method in accordance with claim 11 wherein the second alcohol is the same as that contained in the surfactant system.

13. A method in accordance with claim 1 wherein a mobility control slug is injected into the subsurface earth formation after the surfactant system and before the drive fluid.

14. A method in accordance with claim 1 wherein the drive fluid is an aqueous drive fluid.

15. A method in accordance with claim 1 wherein the subsurface earth formation has been waterflooded prior to carrying out the present method.

* * * * *